United States Patent [19]

Bauer

[11] 4,081,491
[45] Mar. 28, 1978

[54] SATURATED EPOXY RESIN COATING COMPOSITIONS EXHIBITING IMPROVED WEATHERABILITY

[75] Inventor: Ronald S. Bauer, Houston, Tex.

[73] Assignee: Shell Oil Company, Houston, Tex.

[21] Appl. No.: 707,911

[22] Filed: Jul. 22, 1976

[51] Int. Cl.² .............................................. C08L 63/00
[52] U.S. Cl. ..................................... 260/834; 260/831
[58] Field of Search ......................................... 260/834

[56] References Cited

U.S. PATENT DOCUMENTS

| | | | |
|---|---|---|---|
| 2,668,805 | 2/1954 | Greenlee | 260/834 |
| 3,177,090 | 4/1965 | Bayes | 260/834 |
| 3,346,532 | 10/1967 | Greene | 260/834 |
| 3,395,118 | 7/1968 | Reinking | 260/834 |
| 3,812,202 | 5/1974 | Wright | 260/834 |
| 3,844,998 | 10/1974 | Jeffery | 260/834 |

*Primary Examiner*—Paul Lieberman
*Attorney, Agent, or Firm*—Norris E. Faringer

[57] ABSTRACT

The preparation of solid saturated epoxy resin compositions, which when cured with conventional epoxy curing agents yield coatings exhibiting improved weatherability, i.e., better gloss retention and better chalk resistance, are described. The solid saturated epoxy resins are prepared by reacting liquid or semisolid saturated epoxy resins with a dihydroxy phenol such as resorcinol in the presence of a suitable catalyst.

3 Claims, No Drawings

SATURATED EPOXY RESIN COATING COMPOSITIONS EXHIBITING IMPROVED WEATHERABILITY

BACKGROUND OF THE INVENTION

Solid unsaturated epoxy resins may be prepared by reacting a liquid resin with a polyhydric phenol such as bisphenol A in the presence of a suitable catalyst. See, for example, U.S. Pat. No. 3,477,990. The resulting solid epoxy resins prepared by this so-called "fusion" process generally have the same properties, i.e., viscosity, functionality, etc., as solid epoxy resins prepared by reacting the polyhdric phenol such as bisphenol A with epichlorohydrin in the presence of an alkaline catalyst under wellknown conditions. However, when low molecular weight, i.e., liquid, saturated epoxy resins are reacted with polyhydric phenols to produce higher molecular weight solid saturated resins, the resulting cured resins exhibit poor gloss retention and poor chalk resistance. It has now been found that improved weatherability can be achieved when the liquid saturated epoxy resins are reacted wih a dihydroxy monophenol such as resorcinol.

SUMMARY OF THE INVENTION

The present invention provides solid saturated epoxy resins, which when cured with conventional curing agents, exhibit improved weatherability.

DESCRIPTION OF THE PREFERRED EMBODIMENTS

The present invention provides an improved solid saturated epoxy resin wherein a lower molecular weight, i.e., liquid or semi-liquid, saturated epoxy resin is reacted with a dihydroxy monophenol such as resorcinol in the presence of a suitable catalyst. The resulting higher molecular weight, i.e., solid, saturated epoxy resins can then be cured with conventional epoxy curing agents, preferably the phenoplast and aminoplast resins, to produce weather-resistant coatings exhibitng improved gloss retention and improved chalk resistance.

SATURATED EPOXY RESINS

The epoxy compounds useful in the present compositions include those compounds derived from polyhydric phenols and having at least one vicinal epoxy group wherein the carbon-to-carbon bonds within the sixmembered ring are saturated. Such epoxy resins may be obtained by two well-known techniques, i.e., by the hydrogenation of glycidyl polyethers by polyhydric phenols, or (2) by the reaction of hydrogenated polyhydric phenols with epichlohydrin in the presence of a Lewis Acid catalyst and a subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed in U.S. Pat. No. 3,336,241, and is suitable for use in preparing saturated epoxy resins. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by the dehydrohalogenation in the presence of caustic. When the phenol is bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols has been saturated.

In idealized structural formula representing the preferred saturated epoxy compounds is as follows:

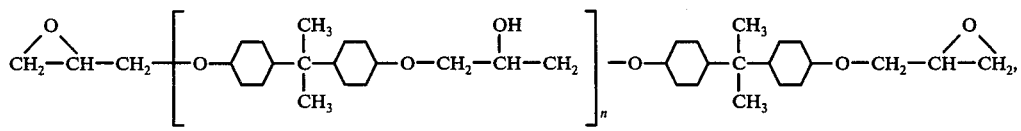

wherein $n$ has a value so that the average molecular weight of the saturated polyepoxide is from about 350 to about 2500.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane having an average molecular weight from about 350 to about 1500.

The above low molecular weight saturated epoxy resins are reacted with a dihydroxy monophenol, such as resorcinol, catechol and hydroquinone, preferably resorcinol, in the presence of a suitable catalyst to produce a solid saturated epoxy resin having a molecular weight from about 1000 to about 3000, or higher.

The amount of liquid epoxide and monophenol utilized may vary over a wide range. For example, if both epoxide groups of a diglycidyl ether are to be reacted, one mole of the diepoxide should be reacted with two moles of the phenol. If a polymeric product is desired, an excess of monohydric phenol would be employed. In general, the mole ratio of phenol to saturated epoxide will vary from about 1.1:1.0 to 0.1:1.0 with from about 0.2:1.0 to 0.8:1.0 being preferred.

The reaction may be conducted in the presence or absence of solvents or diluents. Examples of suitable inert diluents include benzene, toluene, xylene, cyclohexane, and the like.

Suitable catalysts include the onium salts such as the tetraalkyulammonium halides, e.g., tetramethylammonium chloride (TMAC), the phosphonium halides, and organic phosphines. Preferred catalysts are the phosphonium halides and organic phosphines.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Preferred phosphonium halides are those conforming to the formula:

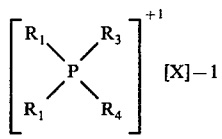

wherein X is a halogen atoms, and $R_1$, $R_2$, $R_3$ and $R_4$ are the same or different and represent hydrocarbon residues which may or may not be substituted by one or more functional groups, such as halogen atoms. These phosphonium halides may generally be prepared by mixing in approximately equimolar proportions a phosphine with a halide. The mixing may be carried out with or without the application of heat, alone or in the presence of an inert solvent such as, for example, diethylether, benzene, chloroform or carbon tetrachloride.

Examples of suitable phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium chloride, ethyl triphenyl phosphonium chloride, propyl tributyl phosphonium iodide, n-butyl triphenyl phosphonium chloride and ethyl triphenyl phosphonium bromide.

Other catalysts include all catalysts known to catalyze the epoxy-phenoxy reaction.

The amount of catalyst will vary over a wide range. In general, a catalytic amount of catalyst is employed, and will vary from about 0.001% to about 10% by weight based on the weight of reactants.

As noted hereinbefore, the instant new higher molecular weight saturated epoxy resins can be reacted with curing agents to form coatings which exhibit improved weatherability, gloss retention, and resistance against chalking. Operable curing agents include materials which are either alkaline or acidic. In fact, any curing agent which is capable of crosslinking or curing an epoxy resin may be suitable, therefore no attempt is made herein to make a complete list of operable curing agents. A very suitable list of such curing agents is found in U.S. Pat. No. 3,336,241 and so much of that disclosure relevant to curing agents is herein incorporated by reference.

Most suitable curing agents include the polycarboxylic acids and polycarboxylic acid anhydrides. Examples of polycarboxylic acids include the di-, tri- and higher carboxylic acids such as oxalic acid, phthalic acid, leiephthalic acid, succinic acid, alkyl and alkenyl-substituted succinic acids, tartaric acid, polymerized fatty acids and the like. Examples of suitable polycarboxylic acid anhydrides include, among others, pyromellitic anhydride, phthalic anhydride, succinic acid anhydride, and maleic acid anhydride. Other curing agents include boron trifluoride and complexes of boron trifluoride with amines, ethers, phenols and the like; Friedel-Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orthophosphite, diethyl orthophosphate and hexaethyltetraphosphate and the like.

Preferred curing agents include the so-called amino resins containing —NH$_2$ groups derived from urea and melamine. Suitable aminocontaining resins are prepared by reacting urea or melamine with formaldehyde under well-known conditions to form a reacting monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is also well-known. Accordingly, a large number of aminoplast and phenoplast resins, i.e., urea-formaldehyde and melamine-formaldehyde resins, are commercially available under such trade designations as Plaskon, Beetle, Cymel, Figerite, Resimene, Curacron and Beckamine, among many others.

Other suitable curing agents include the hydroxyl- and/or carboxyl-functional acrylic resins such as those marketed under the trade designation Acryloid ® Resins.

The present high molecular weight saturated polyepoxides are especially suitable as heat-cured coatings when cured with the aminoplast and/or phenoplast resins.

The formulation of heat-curable or "baked" coatings is well-known. Simply, the resin or resins are usually dispersed with one or more additives such as pigments, fillers, thixotropic agent, flow control agents, antioxidants, and the like, by suitable techniques such as by roller mill. When the roller mill grind dispersion has the proper particle size range, i.e., from about 0.05 mils to about 1.0 mils, the resin/pigment dispersion is mixed with one or more curing agents such as the aminoplast and/or phenoplast resins, solvent and, optionally, a curing catalyst such as para-toluenesulfonic acid (PTSA), phosphoric acid or hydrochloric acid. The resulting enamel is then applied to the substrate by any suitable means such as dipping, spraying, rolling, brushing, or doctor blade. The coating is then baked for from about 5 minutes to about 20 minutes at a temperature from about 170° C to about 230° C.

The amount of pigment employed is usually in amount to produce a pigment to binder weight ratio in the final enamel of from about 25:75 to about 75:25, with about 40:60 to 60:40 being preferred. A pigment to binder (resin plus curing agent) ratio of 50:50 is very suitable. A catalyst such as p-toluenesulfonic acid (PTSA) in 50% isopropyl alcohol (IPA) may be employed in amounts from about 0.1 to about 5.0 phr.

In general, a curing amount of curing agent is employed, i.e., a stoichiometric amount, although up to 25% excess of either epoxy resin or curing agent (e.g. aminoplast) may be employed under some circumstances.

Preferred solvents or diluents include those which are volatile and escape from the polyepoxide composition before or during cure such as, esters as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, such as glycidyl phenyl ether, glycidyl allyl ether, glycidyl acrylate, glycidyl cyclopentyl ether, diglycidyl ether, glycidyl ether of glycerol and the like, and mixtures thereof.

The following examples illustrate the preparation of the present epoxy compositions and are for the purpose of illustration only and are in no way intended to limit the invention to the particular compositions illustrated. Modifications within the spirit and scope of the present invention will become apparent to those skilled in the coatings art. Parts and percentages are by weight unless otherwise noted.

EXAMPLE I

To a flask equipped with a heating mantle, stirrer, thermometer, and nitrogen inlet were added 1551.5 g of the diglycidyl ether of hydrogenated bisphenol A having a weight per epoxide (WPE) of 234 and 290 g resorcinol. The mixture was heated to 200° F and then 1.84 g triphenyl phosphine was added at which time the reaction mixture exothermed to 415° F. Heating was continued at about 370° F for an hour and then the reaction product was poured into an aluminum pan to cool. The recovered product (hereinafter Resin A) had a WPE of 1700, a Fischer-John melting point of 57-60° C, and a viscosity of 265 cps at 40% w in butyl Dioxitol at 77° F.

The above procedures were essentially repeated wherein an equivalent amount of Bisphenol A, a polynuclear diphenol is substituted for resorcinol (a mononuclear diphenol). The resulting resin is hereinafter referred to as Resin B.

EXAMPLE II

Coating solutions were prepared from Resin A of Example I using the following formulations:

A.
31.6 g Resin A from Example I
7.9 g of a melamine-formaldehyde resin (CYMEL 303) from American Cyanamide Co.
39.5 g of titanium dioxide
21.0 g of Cellosolve ® acetate solvent
0.2 phr of $H_3PO_4$ (50% w in isopropyl alcohol)
0.1 phr of flow control agent (FC-430 from 3M Co.)
B.
28.4 g Resin A from Example I
12.2 g of a melamine-formaldehyde resin (CYMEL 303) from American Cyanamide Co.
40.5 g of titanium dioxide
18.9 g Cellusolve ® acetate
0.2 phr of $H_3PO_4$ (50% w in isopropyl alcohol)
0.1 phr of flow control agent (FC-430 from 3M Co.)
C.
25.0 g Resin A from Example I
16.7 g of a melamine-formaldehyde resin (CYMEL 303) from American Cyanamide Co.
41.7 g of titanium dioxide
16.6 g of Cellusolve ® acetate
0.2 phr of $H_3PO_4$ (50% w in isopropyl alcohol)
0.1 phr of flow control agent (FC-430 from 3M Co.)

The coatings were drawn down with a doctor blade on Bonderite 100 panels and then baked at 400° F for 10 minutes. The coated panels were then placed outdoors in Miami, Florida facing south at a 45° angle from the vertical.

The above procedures were substantially repeated wherein Resin B and EPON ® Resin 1007 are each substituted for Resin A. EPON ® Resin 1007 is a glycidyl polyether of 2,2-bis(4-hydroxyphenyl) propane having an average WPE of about 2000 and an average molecular weight of about 2900. The comparative results are tabulated in Table I.

TABLE I
ONE YEAR FLORIDA EXPOSURE DATA ON COATINGS BASED ON MODIFIED GLYCIDYL ETHERS OF HYDROGENATED BISPHENOLS

| Resin System[1,2] | | Ratio Resin | 60° Gloss, % Retention | | | | | Yellowness Index (YI)[3] | |
|---|---|---|---|---|---|---|---|---|---|
| Resin | Curing Agent | Curing Agent | 0 | Months 3 | 6 | 9 | 12 | 0 | Months 12 |
| A | Cymel 303 | 80/20 | 100 | 108 | 82 | 60 | 23 | −0.4 | 3.2 |
| A | Cymel 303 | 70/30 | 100 | 108 | 94 | 77 | 49 | −1.9 | — |
| A | Cymel 303 | 60/40 | 100 | 109 | 92 | 71 | 51 | −1.9 | 1.4 |
| B | Cymel 303 | 80/20 | 100 | 115 | 63 | 8 | — | −1.5 | 4.9 |
| B | Cymel 303 | 70/30 | 100 | 116 | 89 | 32 | 12 | −1.5 | 3.9 |
| B | Cymel 303 | 60/40 | 100 | 116 | 7 | 73 | 35 | −2.7 | 3.7 |
| Epon Resin 1007 | Cymel 303 | 80/20 | 100 | 29 | 5 | — | — | −5.5 | 7.1 |
| Epon Resin 1007 | Cymel 303 | 70/30 | 100 | 84 | 9 | — | — | −4.3 | — |
| Epon Resin 1007 | Cymel 303 | 60/40 | 100 | 104 | 7 | — | — | −2.8 | 5.0 |

[1]Catalyst: 1 phr $H_3PO_4$
[2]Antioxidant: 0.5 phr Irganox 1035, tiodiethylene bis-(3,5-di-tert-butyl-4-hydroxy) hydrocinnamate
[3]YI (ASTM 1925) = (1.28x − 1.06Z/Y measured by Gardner Color Gard Sensor)

What is claimed is:

1. A heat curable composition comprising (1) a solid polyepoxide having an average molecular weight from about 1,000 to about 3,000 prepared by reacting from about 0.2 to about 0.8 moles of resorcinol with 1.0 moles of a glycidyl ether of a polyhydric phenol having at least one vicinal epoxy group and wherein the carbon-to-carbon bonds within the six-membered aromatic ring are saturated and (2) a curing amount of an urea-formaldehyde or melamine-formaldehyde resin.

2. The composition of claim 1 wherein the glycidyl ether is a hydrogenated diglycidyl ether of 2,2-bis(4-hydroxyphenyl)propane.

3. The composition of claim 1 wherein the glycidyl ether is derived from a hydrogenated polyhydric phenol.

* * * * *